United States Patent [19]

Shea et al.

[11] Patent Number: 4,538,653

[45] Date of Patent: Sep. 3, 1985

[54] CLOSURE AND VALVE FOR LIQUID CONTAINER

[75] Inventors: Gregory T. Shea, Westerville; Ernest R. Ballantyne, Columbus, both of Ohio

[73] Assignee: Genoa Group Inc., Columbus, Ohio

[21] Appl. No.: 677,760

[22] Filed: Dec. 4, 1984

[51] Int. Cl.$^3$ .............................................. F16K 5/00
[52] U.S. Cl. ................................. 141/285; 220/253; 251/149
[58] Field of Search ............... 141/285, 286, 290, 301, 141/302, 305, 346, 382, 383, 384, 386; 220/210, 253; 251/149, 149.2, 149.3, 149.4, 149.5

[56] References Cited

U.S. PATENT DOCUMENTS

| 841,350 | 1/1907 | Stock | 251/149 |
|---|---|---|---|
| 1,062,779 | 5/1913 | Hildebrand | 251/149 |
| 2,262,927 | 11/1941 | Fausek et al. | 251/149 |
| 2,311,708 | 2/1943 | Sundholm | 141/384 X |

Primary Examiner—Stephen Marcus
Assistant Examiner—Mark Thronson
Attorney, Agent, or Firm—Carl F. Peters

[57] ABSTRACT

A closure and valve for liquid containers comprises a valve body and a plug body insertable and rotatable therein. Discs are seated within the valve body which have off-center holes which are aligned or misaligned by stems depending from the bottom edge of the plug and which register with notches in the edges of the disc. A non-rotating disc having corresponding off-center holes is placed between the rotating discs. The valve is opened and closed by rotating the plug, after placement in the valve body, which rotates the rotatable discs with respect to the fixed disc.

8 Claims, 7 Drawing Figures

4,538,653

CLOSURE AND VALVE FOR LIQUID CONTAINER

BACKGROUND OF THE INVENTION

In the use, transfer and handling of purified or corrosive liquids including liquid chemicals it is desirable, and often essential to prevent contamination of the liquids by dirt, dust or other foreign substances. Such contamination may occur during the filling or emptying of containers or drums used to store or transport the liquids.

Others have disclosed a variety of closures for drums including valves or caps, some equipped with gates or discs with apertures, which may be alternately opened and closed by suitable mechanical means. Representative of such prior devices are those disclosed in U.S. Pat. Nos. 1,623,056 issued Apr. 5, 1927; 2,247,227 issued June 24, 1941; 2,254,268 issued Sept. 2, 1941; 2,736,339 issued Feb. 28, 1956; 2,832,561 issued Apr. 29, 1958; 2,858,847 issued Nov. 4, 1958; 2,878,829 issued Mar. 24, 1959; 2,889,852 issued June 9, 1959; 2,959,330 issued Nov. 8, 1960; 3,035,603 issued May 22, 1962; 3,434,498 issued Mar. 25, 1969; 3,498,313 issued Mar. 3, 1970; 3,519,014 issued July 7, 1970; 3,625,255 issued Dec. 7, 1971; 3,855,997 issued Dec. 24, 1974; 3,984,021 issued Oct. 5, 1976; 4,082,206 issued Apr. 4, 1978 and 4,224,958 issued Sept. 30, 1980. Many of these devices include complicated features such as spring valves and/or are not suitable for shipment with the containers because of possible damage in transit, or do not ensure contamination-free filling or transfer of the liquids into or from the containers.

SUMMARY OF THE INVENTION

The present invention provides a closure, filling and dispensing, or transfer device (hereinafter referred to as a valve assembly) for containers for liquids that will (1) prevent contamination of the liquid in the container by fugitive particles during filling or emptying, (2) seal the container and prevent contamination of the liquid therein when not in use, and (3) prevent intentional or accidental tampering or manipulation of the device which would expose the contents of the container to the atmosphere.

The valve assembly includes two primary components, a valve body which is permanently affixed to the container and a plug body which is intermittently insertable into the valve body and which is connected to liquid or gas supply lines, preferably by flexible tubes or pipes. The outside diameter of the vertical wall of the plug is such that it will fit snugly into but will rotate within the cavity of the valve body as described later herein. A guide or detent protrudes from the outside of the vertical wall of the plug which registers with and passes through a groove or channel or similar configuration, but with enough clearance so that the guide can easily move through it, machined or molded into the inside wall of the valve body. Alternatively, the guide or detent can be located on the inside wall of the valve body and the groove or channel can be machined, in an appropriate position, into the outside wall of the plug body; the positions of the guide or groove can be changed for different containers, if desired. Depending from the vertical wall of the plug are one or more (preferably two) stems which engage and rotate two in-line discs seated in the valve body to align two off-center holes in the discs when the valve assembly is opened or closed. When the plug is inserted properly into the valve body, the guide or detent directs the plug through the correct rotational sequence to align or misalign the holes in the discs and also secures or locks the plug firmly in place in the valve body.

Between the rotating discs is positioned a fixed (non-rotating) disc having off-center holes which will register with the corresponding holes of the rotating discs when the valve is open for filling or transfer of liquid into or from the container. This disc is fixed in position by means of a vertical splined central (axial) shaft which frictionally engages a splined central (axial) hole in this disc. The rotating discs have notches on their edges which receive the stems and also have central (axial) holes whose diameter is larger than, and do not engage the central shaft. These discs are seated in the cavity of the valve body and have a diameter only slightly less than the inside diameter of the valve body, thereby maintaining alignment of the holes and inlet and outlet pipes of the valve body and plug.

The valve body has an integral horizontal bottom plate or disc to which is fixed the vertical axial shaft, and also has off-center openings of essentially the same diameter as those of the other discs. One of these openings is preferably threaded (or fitted with a threaded adapter) to receive a similarly threaded container-filling (or withdrawal) pipe. The other opening serves as a gas vent which permits the evacuation or introduction of gas during liquid filling and emptying operations.

During storage or when in transit the plug portion of the valve is removed and a cap seals and protects the valve body.

THE DRAWINGS

DESCRIPTION OF THE PREFERRED EMBODIMENT

Figures 1, 2:
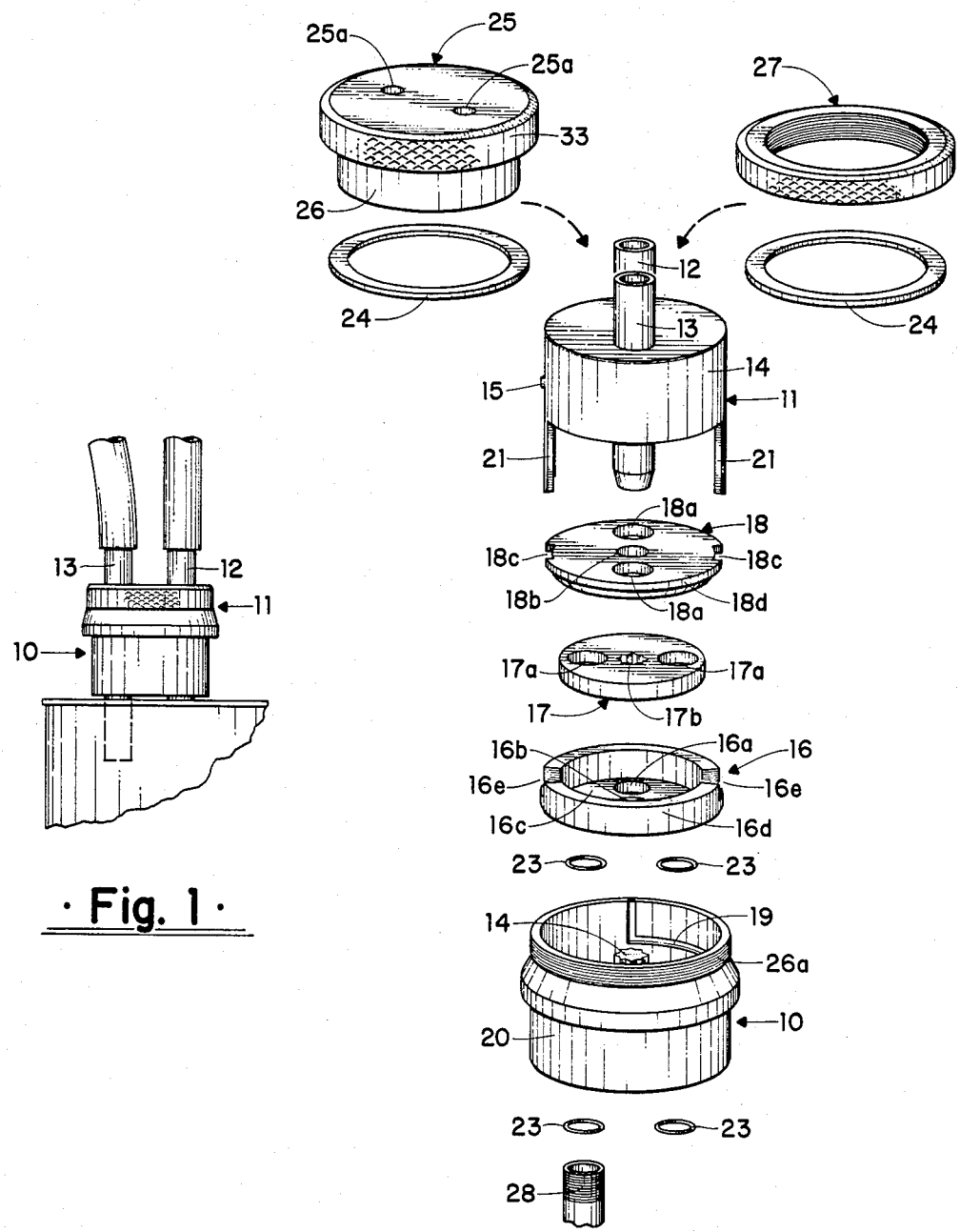
FIG. 1 is a perspective view which shows the valve assembly, and filler and vent tubes, fixed to a drum container.
FIG. 2 shows the components of the valve assembly including the valve body and plug, and intermediate rotating and stationary disc components.

Referring to the drawings, the valve assembly of our invention includes a valve body and a plug, shown generally at 10 and 11 in FIG. 2, respectively. The valve body is spun welded or otherwise permanently affixed to a hole in the top of a drum (partially shown in FIG. 1).

The valve body has a cylindrical shape and consists of a vertical wall 20 (see FIGS. 2 and 6), a threaded top collar 26a, a groove or channel 19 molded or machined in the inside of wall 20, and an axial, vertical splined shaft 14 fixed to the bottom portion 34 of the valve body. This bottom portion is like a plate or disc which is integral with the wall 20, and has two off-center ports or holes (see FIGS. 5 and 6) having approximately the same diameter as corresponding holes 16a, 17a and 18a in discs 16, 17 and 18. One of these holes is threaded, or has a threaded adapter or pipe 32 to accept container inlet pipe 28 (see FIG. 2 for detail). Notches 31 accept the bottom portions of stems 21 when the valve assembly is locked.

Figure 3:
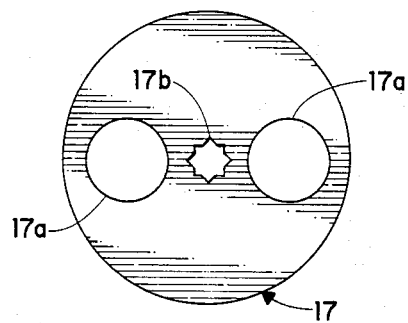
FIG. 3 is a top plan view of the non-rotating disc component.

The valve body 10 also contains three discs 16, 17 and 18 which are seated or fitted sequentially therein by sliding them downward over shaft 14. Disc 17 (FIG. 3) has an axial hole 17b which engages the shaft 14 firmly to prevent rotation of the disc. Other means for accomplishing this will occur to those skilled in the art.

Disc 17 has two off-center holes 17a which will register with similarly placed holes in discs 16, 18 and 34 when the valve is in filling position. Disc 17 is seated inside disc 16, the latter having a short vertical wall 16d featuring notches 16e which engage stems 21 depending from wall 14 of the plug body 11. The disc 16 has an axial hole 16b (partially shown) large enough to permit free rotation around shaft 14, and two off-center holes 16a (one not shown) having diameters approximately the same as, and similarly located to the corresponding holes in discs 17 and 18.

Figure 4:
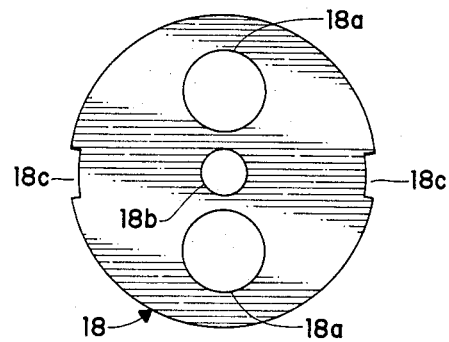
FIG. 4 is a top plan view of the upper rotating disc component.

Above disc 17 is another disc 18 (FIGS. 2 and 4) having oppositely disposed notches 18c, positioned to be aligned with notches 16e of disc 16. Disc 18 has an axial hole 18b which accepts the center shaft 14 but around which it rotates freely; and also two off-center holes 18a of diameter about the same as, and similarly located with respect to the corresponding holes in discs 16 and 17. Disc 18 will preferably have a shoulder 18d, as shown in FIG. 2, which seats on the top surface of the wall 16d of disc 16.

Plug body 11 has the form of an inverted cylinder with its top surface having two holes for liquid and gas supply lines 13 and 12. On the exterior surface of the cylinder wall 14 a guide or detent 15 projects outwardly. It has a size and configuration designed so that it will fit into and slide through short vertical legs and have a longer horizontal leg of channel 19 of the valve body when the plug is inserted and turned therein to lock the plug in position or to open and close the valve by turning the plug body to align or misalign the off-center holes in the bottom plate or disc 34 of valve body 10 and in discs 16, 17 and 18. One or more stems 21, preferably two, positioned 180° from each other, depend from the lower edge of wall 14 of the plug. When the plug is inserted into the valve body, the discs 16 and 18 should be placed and aligned in the valve body so that the stems 21 register with notches 16e and 18c. Off-center holes 16a and 18a in these discs will also be aligned but not with holes 17a of disc 17. When the plug is inserted in the valve body and rotated by means of detent 15 in channel 19, the discs 16 and 18 will also rotate thereby opening the valve for filling of the container. The valve assembly is locked when the stems are inserted into notches 31 (FIG. 5) of the valve body.

The O rings shown below disc 16 (FIG. 2) are positioned in channels 29 in the bottom plate or disc of valve body 10 and form a seal with the bottom edge of plug 11 when the plug is turned and locked in position in the valve body. The O rings 23 shown below the valve body are positioned in channels 23a located in the upper portions of the liquid and vent pipes depending from the bottom plate of the valve body. When the plug is turned and locked in position in the valve body, the lower edges of these pipes seat on or fit snugly into these rings.

Figure 7:
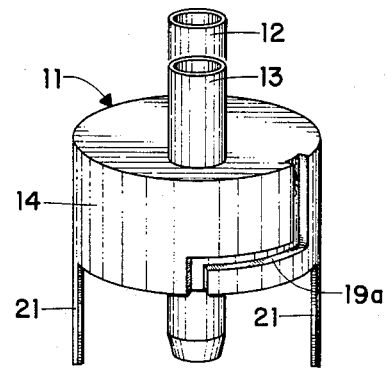
FIG. 7 is a view similar to FIG. 2 showing a plug body with the groove or channel located in the outside wall of the plug.

An alternate, and preferred embodiment of our invention is shown in FIG. 7. A groove or channel 19a is molded or machined into the exterior surface of wall 14 of plug 11, similar to the groove or channel 19 of plug 11 shown in FIG. 2, and a detent or guide (not shown) is molded on or otherwise affixed to the inside of wall 20 of valve body 10, both being positioned so that they will register and function to open, close and lock the valve assembly as described above in connection with the embodiment of FIGS. 2 and 5.

Figure 5:
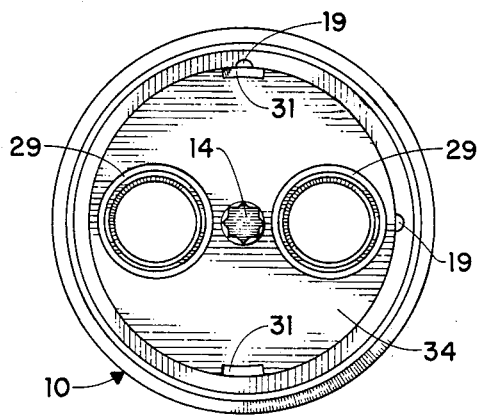
FIG. 5 is a plan view looking down into the valve body showing locations of the axial shaft; holes for liquid inlet (into the container) and gas vent pipes; and notches for bottoming the stems when the valve assembly is locked.
Figure 6:
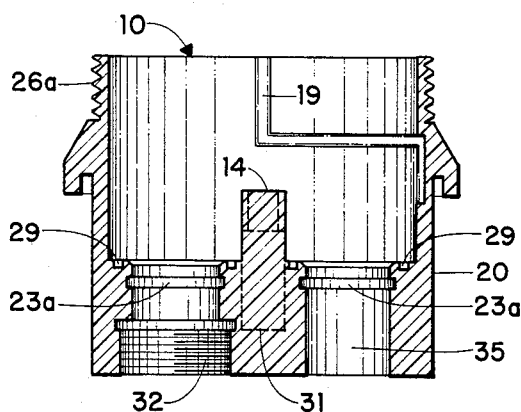
FIG. 6 is an enlarged cross sectional view of the valve body component showing the groove or channel in the inside wall of the valve body for orientation of the plug by its detent, and threaded outlet connection for a filling tube in the container.

FIGS. 5 and 6 show channels for the O rings 23 (shown in FIG. 2) around the off-center holes in the bottom plate of valve body 10, the central splined shaft 14 and the notches 31 for seating the stems 21 when the valve assembly is in closed and locked position. In another embodiment, the sound vent channel 35 could be replaced with two channels and two holes are used in bottom plate 34, using O rings in grooves 23a around the top of each channel and using either one groove 29 and O ring around both vent channels, or one groove 29 and O ring around the top of each vent channel.

The valve is unlocked by passing the detent of the plug (or the valve body) through the vertical leg of groove or channel 19 (or 19a) and then rotating by means of the detent traversing the horizontal leg of the groove. In this sequence the stems 21 on the plug rotate the discs 16 and 18 aligning their holes 16a and 18a with each other and also with holes 17a of disc 17 and the container may be filled or liquid withdrawn therefrom.

When the valve is not in use, namely when the plug 11 is not in place, the discs 16 and 18 are oriented so that the off-center holes are out of alignment with the corresponding holes in disc 17, thus sealing the contents of the container from outside contamination. Also, the contents of the container are secured from accidental or deliberate tampering unless a special tool were used to unlock the valve.

When the valve assembly is in service or temporary storage, the plug body is held in place in the valve body by means of an internally threaded knurled nut 27 which, after a sealing gasket 24 is placed on top of the plug's perimeter surface, is turned onto threaded collar 26a of the valve body. When the container is shipped from one geographical location to another, the nut 27 is removed, the plug 11 with its vent and liquid supply lines 12 and 13 are removed from the valve body 10, and a protective cap 25 having an internally threaded collar 33 and a vertical wall 26 is turned onto collar 26a of the valve body. The top surface of this cap may have circular depressions (or projections) to permit use of a wrench or other tool to turn down or loosen the cap, as required.

The plug, valve body and discs can be fabricated from a variety of metals, metal alloys and polymeric materials, these being selected based on the liquid content of the container. The components of the valve assembly should be resistant to chemical or physical attack by the liquid passing therethrough. In some cases, stainless steels or other corrosion resistant alloy may be used for all or some of the valve assembly components. We have found that polyethylene is a particularly suitable material for manufacture of the components. It is resistant to most chemicals. In special cases, the components may be fabricated from polypropylene, polyvinylchloride, polytetrafluoroethylene (PTFE) and similar polymeric materials. In other cases, a combination of polymeric and metallic components may be used for fabrication of the components.

We claim:

1. A closure, filling and dispensing device for drums and other containers for liquids comprising
   (a) a lower valve body consisting of a cylindrical housing with an inner wall,
   (b) a rotatable upper plug body insertable into valve body (a) and having two channels therein and equipped with liquid and gas supply lines traversing the top of the plug body,
   (c) a groove in the inside wall of valve body (a) or in the outside wall of plug body (b),
   (d) a guide detent protruding from the inside wall of valve body (a) or from the outside wall of plug body (b) positioned to register with and pass through the groove (c) when the valve and plug bodies are assembled, to lock them together,
   (e) two rotatable in-line discs positioned in said valve body, said discs having off-center fluid inlet and outlet openings and an axial hole, said plug body having at least one downwardly depending stem for rotating said in-line discs,
   (f) a non-rotating disc, positioned in said valve body between said rotating discs, having an axial hole and off-center fluid inlet and outlet openings which will register with corresponding openings in the discs of (e),
   (g) an axial splined shaft secured in the bottom of the valve body which non-engagedly traverses the axial holes in the rotating discs but engages the wall of the hole in the non-rotating disc,
   (h) the rotating discs being notched on their edges to receive said depending stem to rotate the rotating discs but not the non-rotating disc when the plug body is rotated,
   (i) the holes in the rotating discs always being in alignment with respect to each other and in alignment with the holes in the non-rotating disc during fluid transfer but in non-alignment therewith when the valve is closed during storage or transit of the drum,
   (j) fluid inlet and outlet channels in the valve body (a) corresponding to and aligned with the channels in the plug body (b).
   (k) and means for holding the valve body and plug body together after assembly.

2. A closure, filling and dispensing device for drums and other containers for liquids comprising
   (a) a lower valve body consisting of a cylindrical housing with an inner wall,
   (b) a rotatable upper plug body insertable into valve body (a) and having two channels therein and equipped with liquid and gas supply lines traversing the top of the plug body,
   (c) a groove in the inside wall of valve body (a) or in the outside wall of plug body (b),
   (d) a guide detent protruding from the inside wall of valve body (a) or from the outside wall of plug body (b) positioned to register with and pass through the groove (c) when the valve and plug bodies are assembled, to lock them together,
   (e) two rotatable in-line discs positioned in said valve body, said discs having off-center fluid inlet and outlet openings and an axial hole, said plug body having at least one downwardly depending stem for rotating said in-line discs,
   (f) a non-rotating disc, positioned in said valve body between said rotating discs, having an axial hole and off-center fluid inlet and outlet openings which will register with corresponding openings in the discs of (e),
   (g) an axial splined shaft secured in the bottom of the valve body which non-engagedly traverses the axial holes in the rotating discs but firmly engages the wall of the hole in the non-rotating disc,
   (h) the rotating discs being notched on their edges to receive said depending stem to rotate the rotating discs but not the non-rotating disc when the plug body is rotated,
   (i) the holes in the rotating discs always being in alignment with respect to each other and in alignment with the holes in the non-rotating disc during fluid transfer but in non-alignment therewith when the valve is closed during storage or transit of the drum,
   (j) fluid inlet and outlet channels in the valve body (a) corresponding to and aligned with the channels in the plug body (b),
   (k) and means for holding the valve body and plug body together after assembly.

3. A device according to claims 1 or 2 wherein the detent protrudes from the inside wall of the valve body (a) and the groove (c) is in the outside wall of the plug body (b).

4. A device according to claims 1 or 2 wherein the detent protrudes from the outside wall of the plug body (b) and the groove (c) is in the inside wall of the valve body (a).

5. A device according to claim 1 wherein the rotating disc positioned below the non-rotating disc has a short vertical wall notched to receive said depending stem.

6. A device according to claim 1 wherein the groove (c) in the wall of the valve body (a) which accepts the detent (d) of the plug body (b) has a short vertical leg and a longer horizontal leg.

7. A device according to claim 5 wherein the rotating disc positioned above the non-rotating disc has a shoulder, the under surface of which registers with and overlays the upper surface of the short vertical wall of the lower rotating disc.

8. A device according to claim 1 wherein the plug body (b) has two depending stems positioned about 180° from each other.

* * * * *